(12) United States Patent
Yodogawa et al.

(10) Patent No.: US 11,034,124 B2
(45) Date of Patent: Jun. 15, 2021

(54) INSULATED CONDUIT INCLUDING A FLUOROPOLYMER COMPOSITION FOR USE AS A THERMAL INSULATION LAYER

(71) Applicants: AGC CHEMICALS AMERICAS, INC., Exton, PA (US); Asahi Glass Company, Limited, Tokyo (JP)

(72) Inventors: Masahide Yodogawa, Chiba Prefecture (JP); David J. Lavanga, Reading, PA (US); Dennis G Murphy, Warminster, PA (US); Ken Iruya, Chiba Prefecture (JP)

(73) Assignees: AGC CHEMICALS AMERICAS, INC., Exton, PA (US); AGC INC., Tokyo (JP)

( * ) Notice: Subject to any disclaimer, the term of this patent is extended or adjusted under 35 U.S.C. 154(b) by 503 days.

(21) Appl. No.: 15/772,401

(22) PCT Filed: Nov. 2, 2016

(86) PCT No.: PCT/US2016/060039
§ 371 (c)(1),
(2) Date: Apr. 30, 2018

(87) PCT Pub. No.: WO2017/079238
PCT Pub. Date: May 11, 2017

(65) Prior Publication Data
US 2018/0312679 A1 Nov. 1, 2018

Related U.S. Application Data

(60) Provisional application No. 62/249,717, filed on Nov. 2, 2015.

(51) Int. Cl.
*B32B 1/08* (2006.01)
*F16L 9/12* (2006.01)
(Continued)

(52) U.S. Cl.
CPC ............ *B32B 1/08* (2013.01); *B29C 48/022* (2019.02); *B32B 5/18* (2013.01); *B32B 5/32* (2013.01);
(Continued)

(58) Field of Classification Search
CPC .. B32B 1/08; B32B 7/12; B32B 25/16; B32B 27/08; B32B 27/304; B32B 27/322;
(Continued)

(56) References Cited

U.S. PATENT DOCUMENTS 2,644,066 A 6/1953 Glynn
2,736,649 A 2/1956 Phillips
(Continued)

FOREIGN PATENT DOCUMENTS

CA 2835008 A1 11/2012
CN 101223229 B 9/2011
(Continued)

OTHER PUBLICATIONS

International Search Report for Application No. PCT/US2016/060039 dated Feb. 23, 2017, 3 pages.
(Continued)

*Primary Examiner* — Walter Aughenbaugh
(74) *Attorney, Agent, or Firm* — Howard & Howard Attorneys PLLC (57) ABSTRACT

An insulated conduit for use in offshore, deep water environments includes a pipe and a fluoropolymer composition. The pipe has an outer surface with the fluoropolymer composition disposed about the outer surface of the pipe for providing a thermal insulation layer. The fluoropolymer composition includes a fluoroplastic polymer present in an amount of at least 50 parts by weight based on 100 parts by weight of the fluoropolymer composition. The fluoropolymer composition also includes a fluoroelastomer present in
(Continued)

an amount of a fluoroelastomer present in an amount of from about 20 to about 50 parts by weight based on 100 parts by weight of the fluoropolymer composition. The fluoropolymer composition has a thermal conductivity less than about 0.20 W/mK at 205° C.

25 Claims, 1 Drawing Sheet

(51) Int. Cl.
- B29C 48/02 (2019.01)
- B32B 7/12 (2006.01)
- B32B 25/16 (2006.01)
- B32B 27/32 (2006.01)
- B32B 27/38 (2006.01)
- B32B 27/40 (2006.01)
- C09D 127/18 (2006.01)
- B32B 27/08 (2006.01)
- B32B 25/04 (2006.01)
- B32B 25/08 (2006.01)
- B32B 5/18 (2006.01)
- B32B 27/06 (2006.01)
- B32B 5/32 (2006.01)
- B32B 25/20 (2006.01)
- B32B 25/18 (2006.01)
- F16L 9/133 (2006.01)
- B29C 48/00 (2019.01)
- C08L 27/18 (2006.01)
- B32B 27/30 (2006.01)
- E21B 41/00 (2006.01)

(52) U.S. Cl.
CPC ............ *B32B 7/12* (2013.01); *B32B 25/042* (2013.01); *B32B 25/08* (2013.01); *B32B 25/16* (2013.01); *B32B 25/18* (2013.01); *B32B 25/20* (2013.01); *B32B 27/065* (2013.01); *B32B 27/08* (2013.01); *B32B 27/304* (2013.01); *B32B 27/32* (2013.01); *B32B 27/322* (2013.01); *B32B 27/325* (2013.01); *B32B 27/38* (2013.01); *B32B 27/40* (2013.01); *C08L 27/18* (2013.01); *C09D 127/18* (2013.01); *F16L 9/121* (2013.01); *F16L 9/123* (2013.01); *F16L 9/133* (2013.01); *B32B 2266/0228* (2013.01); *B32B 2270/00* (2013.01); *B32B 2307/302* (2013.01); *B32B 2307/304* (2013.01); *B32B 2307/308* (2013.01); *B32B 2307/752* (2013.01); *B32B 2597/00* (2013.01); *C08L 2205/02* (2013.01); *C08L 2205/025* (2013.01); *E21B 41/00* (2013.01)

(58) Field of Classification Search
CPC ..... B32B 27/38; B32B 27/40; B32B 2270/00; B32B 2307/304; B32B 2307/308; B32B 2307/752; B32B 2597/00; F16L 9/121; F16L 9/123; F16L 9/133; B29C 48/022
See application file for complete search history.

(56) References Cited

U.S. PATENT DOCUMENTS

| | | |
|---|---|---|
| 5,527,612 A | 6/1996 | Ohta et al. |
| 6,264,871 B1 | 7/2001 | Mullen et al. |
| 8,397,765 B2 | 3/2013 | Jackson et al. |
| 8,426,509 B2 | 4/2013 | Abusleme et al. |
| 8,816,214 B2 | 8/2014 | Ziegler et al. |
| 8,816,215 B2 | 8/2014 | Reul et al. |
| 9,810,366 B2 | 11/2017 | Hegdal et al. |
| 2006/0293432 A1 | 12/2006 | Hirano et al. |
| 2007/0105412 A1 | 5/2007 | Hoepfner et al. |
| 2008/0032080 A1 | 2/2008 | Faulkner et al. |
| 2009/0159146 A1 | 6/2009 | Jackson et al. |
| 2009/0202769 A1 | 8/2009 | Masuda et al. |
| 2010/0043906 A1 | 2/2010 | Jackson et al. |
| 2011/0165407 A1 | 7/2011 | Weidinger et al. |
| 2011/0297316 A1 | 12/2011 | Jackson et al. |
| 2014/0182932 A1 | 7/2014 | Cholewa et al. |
| 2014/0311614 A1 | 10/2014 | Edmondson et al. |
| 2014/0377558 A1 | 12/2014 | Mizuno et al. |
| 2015/0041018 A1 | 2/2015 | Wan et al. |
| 2015/0175779 A1 | 6/2015 | Yamada et al. |
| 2016/0018049 A1 | 1/2016 | Yodogawa et al. |

FOREIGN PATENT DOCUMENTS

| | | | |
|---|---|---|---|
| EP | 2543229 B1 | 1/2017 | |
| GB | 2165910 A | 4/1986 | |
| JP | 2006316112 A | 11/2006 | |
| JP | 2010186585 A | 8/2010 | |
| JP | 4639820 B2 | 2/2011 | |
| JP | 2016050654 A | 4/2016 | |
| WO | 8911618 A1 | 11/1989 | |
| WO | 2009027686 A1 | 3/2009 | |
| WO | 2013070074 A1 | 5/2013 | |
| WO | 2013154432 A1 | 10/2013 | |
| WO | 2014028444 A2 | 2/2014 | |
| WO | 2015017937 A1 | 2/2015 | |
| WO | 2016024938 A1 | 2/2016 | |
| WO | WO 2016/024938 | * 4/2016 | ............ C08F 214/26 |

OTHER PUBLICATIONS

International Search Report for Application No. PCT/CA2014/050749 dated Sep. 8, 2014, 2 pages.
Bredero Shaw, "Complete Coating Assurance Video", https://www.youtube.com/watch?v=eAo2XL-BOHg, May 21, 2014, 1 page.
Trelleborg Group, "Offshore Mobile Productin Unit Video", https://www.youtube.com/watch?v=Ji5WzvGF3Fk, Mar. 31, 2015, 1 page.
English language abstract for EP 2 543 229 extracted from espacenet.com database on May 23, 2018, 2 pages.
English language abstract for JP 2006-316112 extracted from espacenet.com database on May 23, 2018, 1 page.
English language abstract and machine-assisted English translation for JP 2010-186585 extracted from the PAJ database on May 23, 2018, 7 pages.
English language abstract and machine-assisted English translation for JP 4639820 extracted from espacenet.com database on May 23, 2018, 17 pages.
English language abstract and machine-assisted English translation for JP 2016-050654 extracted from espacenet.com database on May 23, 2018, 30 pages.
English language abstract for CN 101223229 extracted from espacenet.com database on Oct. 9, 2019, 2 pages.

* cited by examiner

INSULATED CONDUIT INCLUDING A FLUOROPOLYMER COMPOSITION FOR USE AS A THERMAL INSULATION LAYER

CROSS REFERENCE TO RELATED APPLICATIONS

The present application is the National Stage of International Patent Application No. PCT/US2016/060039, filed on Nov. 2, 2016, which claims the benefit of U.S. Provisional Application Ser. No. 62/249,717, filed on Nov. 2, 2015, the disclosure of which is hereby incorporated by reference in its entirety.

FIELD OF THE DISCLOSURE

The present disclosure generally relates to a fluoropolymer composition. More specifically, the present disclosure relates to a fluoropolymer composition which is used as thermal insulation layer about an insulated conduit.

BACKGROUND

Transport conduits are commonly used to transport fluids, such as oil and gas, in the oil and gas industry. Often these transport conduits operate in offshore, deep water environments (e.g. environments having a high temperature (e.g. greater than 130° C. (e.g. 200° C.)) and at depths exceeding 1,000 meters). Typically, a thermal insulation layer is applied to the transport conduit to provide controlled energy loss and maintain a temperature of the liquid in the deep water environments. Maintaining the temperature of the liquid in the transport conduit prevents the formation of hydrates and waxes in the liquid, particularly when the liquid is oil. If present, the hydrates and/or waxes typically decrease pumping efficiency of the liquid. Conventional thermal insulation layers are typically not capable of maintaining the temperature of the liquid in the transport conduit when the temperature of the liquid approaches 200° C. In addition, conventional thermal insulation layers typically require the thermal insulation layer to be crosslinked or to be thermoset, which adds complexity and cost to the application of the thermal insulation layer to the transport conduit. As such, there remains an opportunity to develop a thermoplastic composition for use as a thermal insulation layer, such that the transport conduit can be utilized in offshore, deep water environments to transport liquid at temperatures at or above 200° C.

SUMMARY OF THE DISCLOSURE AND ADVANTAGES

The present disclosure provides an insulted conduit for use in offshore, deep water environments. The insulated conduit includes a pipe and a fluoropolymer composition. The pipe has an outer surface. The fluoropolymer composition is disposed about the outer surface of the pipe for providing a thermal insulation layer. The fluoropolymer composition includes a fluoroplastic polymer present in an amount of at least 50 parts by weight based on 100 parts by weight of the fluoropolymer composition. The fluoropolymer composition also includes a fluoroelastomer present in an amount of from about 20 to about 50 parts by weight based on 100 parts by weight of the fluoropolymer composition. The fluoropolymer composition has a thermal conductivity less than about 0.20 W/mK at 205° C.

The present disclosure also provides a method of forming a thermal insulation layer about a conduit. The method includes providing the conduit and providing a melt processable fluoropolymer composition. The conduit includes a pipe having an outer surface. The melt processable fluoropolymer composition includes a fluoroplastic polymer present in an amount of at least 50 parts by weight based on 100 parts by weight of the melt processable fluoropolymer composition. The melt processable fluoropolymer composition also includes a fluoroelastomer present in an amount of from about 20 to about 50 parts by weight based on 100 parts by weight of the melt processable fluoropolymer composition. The method also includes extruding the melt processable fluoropolymer composition to form the thermal insulation layer about the outer surface of the pipe of the conduit. The thermal insulation layer has a thermal conductivity of less than about 0.20 W/mK at 205° C.

The combination and relative amount of the fluoroplastic polymer and the fluoroelastomer in the melt processable fluoropolymer composition allows the melt processable fluoropolymer composition to be applied to the conduit via an extrusion method thereby forming the thermal insulation layer without crosslinking. Despite being thermoplastic (i.e., not crosslinked), the thermal insulation layer has a thermal conductivity of less than about 0.20 W/mK at 205° C. and is suitable for use in offshore, deep water environments. In particular, the insulated conduit with the thermal insulation layer (i.e., the fluoropolymer composition) is suitable for use in water at depths greater than 1,000 meters and temperatures at or exceeding 200° C.

BRIEF DESCRIPTION OF THE DRAWINGS

Advantages of the present invention will be readily appreciated, as the same becomes better understood by reference to the following detailed description, when considered in connection with the accompanying drawings.

DETAILED DESCRIPTION OF THE DISCLOSURE

Figure 1:
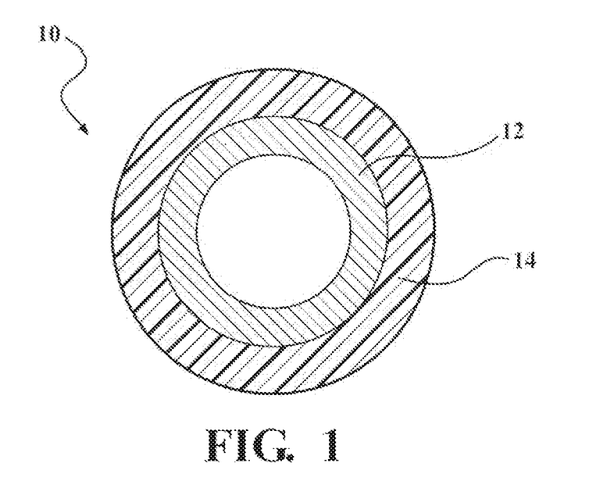
FIG. 1 is a cross-sectional view of an embodiment of an insulated conduit.

The present disclosure provides an insulated conduit 10 for use in offshore, deep water environments (e.g. environments having a high temperature (e.g. greater than 130° C. (e.g. 200° C.)) and at depths exceeding 1,000 meters). The insulated conduit 10 includes a pipe 12. In certain embodiments, the insulated conduit 10 includes multiple pipes 12. The pipe 12 has an outer surface and an inner surface. The outer and inner surfaces are opposite one another, with the inner surface defining a fluid channel for transporting fluids. For example, insulated conduit 10 may transport oil and/or gas. The insulated conduit 10 also includes a fluoropolymer composition disposed about the outer surface of the pipe 12 for providing a thermal insulation layer 14. The thermal insulation layer 14 disposed about the outer surface of the pipe 12 may be directly disposed on the pipe 12 or spaced from the pipe 12 by one or more additional layers included in the insulated conduit 10.

The fluoropolymer composition includes a fluoroplastic polymer and a fluoroelastomer. The fluoroplastic polymer may include one or more fluoroplastic polymers. Likewise, the fluoroelastomer may include one or more fluoroelastomers.

The fluoroplastic polymer is a fluoropolymer having a melting point. A fluoropolymer is generally understood to be a polymer that contains multiple instances of C—F bonds. Conversely, the fluoroelastomer is a fluoropolymer that does not have a melting point (i.e., the fluoroelastomer does not melt). Although not required, typically the fluoroelastomer is capable of being crosslinked.

Certain examples of the fluoroplastic polymer include, but are not limited to, one or more of the following fluoropolymers: a perfluoroalkoxy copolymer of polytetrafluoroethylene and perfluoro alkylvinyl ether (PFA), a polytetrafluoroethylene, a fluorinated ethylene propylene, a tetrafluoroethylene/hexafluoropropylene copolymer, a polyvinyldienefluoride (PVDF), a polyvinylfluoride, an ethylene/tetrafluoroethylene (ETFE) copolymer, an ethylene/tetrafluoroethylene/hexafluoropropylene copolymer, a vinylidene fluoride/hexafluoropropylene/tetrafluoroethylene copolymer, an ethyl ene/chlorotrifluoroethylene copolymer, and/or polychlorotrifluoroethylene.

In certain embodiments, the fluoroelastomer is a copolymer of tetrafluoroethylene/propylene (TFE/P) or an FKM fluoropolymer. The FKM fluoropolymer is a fluoropolymer defined by ASTM D1418. The FKM fluoropolymer includes Type 1, Type 2, Type 3, Type 4, and Type 5 FKM fluoropolymers.

Certain examples of the fluoroelastomer include, but are not limited to, one or more of the following fluoropolymers: a TFE/P copolymer, a tetrafluoroethylene/propylene/vinylidenefluoride copolymer, a vinylidenefluoride/hexafluoropropylene copolymer, a vinylidenefluoride/hexafluoropropyl ene/tetrafluoroethylene copolymer, a vinylidenefluoride/tetrafluoroethylene/perfluoroalkylvinylether copolymer, a vinylidenefluoride/hexafluoropropyl ene/tetrafluoroethylene/perfluoroalkylvinylether copolymer, a vinylidenefluoride/hexafluoropropyl ene/perfluoroalkylvinylether copolymer, a tetrafluoroethylene/ethyl ene/perfluoroalkylvinyl ether copolymer, a vinylidenefluoride/hexafluoropropylene/tetrafluoroethylene/ethylene/perfluoroalkylvinyl ether copolymer, a vinylidenefluoride/chlorotrifluoroethylene copolymer, a 1,1,1,2-tetrafluoro-2-propene/vinylidene fluoride copolymer.

The fluoropolymer composition includes the fluoroplastic polymer in an amount of at least 50 parts by weight based on 100 parts by weight of the fluoropolymer composition. Alternatively, the fluoroplastic polymer may be present in an amount of from about 50 to about 80, from about 50 to about 75, from about 50 to about 70, from about 50 to about 60, from about 55 to about 80, from about 60 to about 80, from about 65 to about 80, or about 70 to about 80, parts by weight based on 100 parts by weight of the fluoropolymer composition.

The fluoropolymer composition includes the fluoroelastomer in an amount from about 20 to about 50, from about 20 to about 45, from about 20 to about 40, from about 20 to about 35, from about 25 to about 50, from about 30 to about 50, from about 35 to about 50, or about 40 to about 50, parts by weight based on 100 parts by weight of the fluoropolymer composition.

In certain embodiments, the fluoropolymer composition consists essentially of the fluoroplastic polymer and the fluoroelastomer. In one embodiment, the fluoropolymer composition consists essentially of ETFE in an amount of from about 50 to about 70 parts by weight, and TFE/P in an amount of from about 30 to about 50 parts by weight, each based on 100 parts by weight of the fluoropolymer composition. The term "consists essentially of" as used throughout this disclosure allows for the inclusion of addition materials, such as the additives described below, so long as the additional materials are present in an amount less than 5 parts by weight based on 100 parts by weight of the fluoropolymer composition, or the additional materials do not adversely influence the thermal conductivity and thermal stability of the fluoropolymer composition at 205° C.

In one embodiment, the fluoropolymer composition consists essentially of (i) ETFE in an amount of from about 50 to about 80 parts by weight based on 100 parts by weight of the fluoropolymer composition and (ii) the fluoroelastomer in an amount of from about 20 to about 50 parts by weight based on 100 parts by weight of the fluoropolymer composition. In this embodiment, the fluoroelastomer is selected from the group consisting of (a) TFE/P, (b) the FKM fluoropolymer, and (c) combinations thereof.

The fluoropolymer composition may also include a functional fluoropolymer. Typically, the functional fluoropolymer is a thermoplastic fluoropolymer (i.e., fluoroplastic polymer comprises the functional fluoropolymer, because the functional fluoropolymer has a melt point). The functional fluoropolymer contains at least one of the following functional groups: a carboxylic acid group, an ester group, a carbonate group, an anhydride group, or an epoxy group. The functional group(s) may be located at any position on the fluoropolymer. For example, the functional group may be at the end of the polymer chain, within the polymer chain, or extending from a side chain that extends from the backbone of the polymer. Without being held to any particular theory, it is believed that the functional fluoropolymer increases the adhesion of the thermal insulation layer 14 (i.e., the fluoropolymer composition once disposed about the outer surface of the pipe 12) to the pipe 12 and/or to an adjacent layer (described further below). The increased adhesion is believed to be the result of the functional group associating with or bonding to the surface of the pipe 12 and/or adjacent layer. Increasing the adhesion of the thermal insulation layer 14 is desirable because strong adhesion prevents water from penetrating to the pipe 12. Alternatively, increasing the adhesion reduces the amount of water penetrating to the pipe 12. As described in further detail below, if water is able to penetrate to the pipe, the water will adversely impact the thermal conductivity of the thermal insulation layer 14. As such, including the functional fluoropolymer in the fluoropolymer composition increases the thermal insulation of the fluoropolymer composition by improving or assuring proper adhesion of the thermal insulation layer 14 to the pipe 12 and/or adjacent layers.

Typically, when the functional fluoropolymer is included in the fluoropolymer composition, the functional fluoropolymer is present in an amount of from about 1 to about 15 parts by weight based on 100 parts by weight of the fluoropolymer composition. Alternatively, the functional fluoropolymer is present in an amount of from about 5 to about 15, or about 10, parts by weight based on 100 parts by weight of the fluoropolymer composition.

In one embodiment, the functional fluoropolymer includes a reaction product of (i) a monomer containing an anhydride, (ii) ethylene, and (iii) tetrafluoroethylene. In this embodiment, the reaction product may be generally referred to as functionalized ETFE. Although not required, the monomer containing the anhydride may be hydrolyzed such that the functionalized ETFE of this embodiment contains a carboxylic acid functional group. In certain embodiments, the monomer containing the anhydride is itaconic anhydride. One example of a functionalized ETFE is commercially available from Asahi Glass Co, LTD. under the tradename FLUON® LM-ETFE-AH. In addition, it should be appreciated that the functionalized ETFE is a fluoroplastic polymer.

In certain embodiments, the fluoropolymer composition comprises or consists essentially of the fluoroplastic polymer in an amount of from about 50 to about 80 parts by weight and the fluoroelastomer in an amount of from about 20 to about 50 parts by weight, each based on 100 parts by weight of the fluoropolymer composition. In addition, the fluoroplastic polymer includes the functionalized ETFE in an amount of from about 5 to about 20 parts by weight, based on 100 parts by weight of the fluoropolymer composition. Typically, in this embodiment, the fluoroelastomer is TFE/P. In addition, typically the remaining portion of the fluoroplastic polymer is ETFE. For example, the fluoroplastic polymer may comprise or consist essentially of ETFE in an amount of about 45 to about 75 parts by weight and the functional EFTE in an amount of about 5 to about 20 parts by weight, each based on 100 parts by weight of the fluoropolymer composition, for a combined total of 50 to about 80 parts by weight of the fluoroplastic polymer based on 100 parts by weight of the fluoropolymer composition.

The thickness of the thermal insulation layer 14 (i.e., the fluoropolymer composition once disposed about the outer surface of the pipe 12) on the insulated conduit 10 is highly variable, due to the fact that each insulated conduit 10 is designed for use under specific conditions of depth, temperature, etc. In certain embodiments, the thickness of the thermal insulation layer 14 is from about 5 mm to about 150 mm. In other embodiments, the thickness of the thermal insulation layer 14 is from about 40 to about 100 mm thick. It is also to be appreciated that because the thermal insulation layer 14 is the fluoropolymer composition once the fluoropolymer composition is disposed about the outer surface of the pipe 12, any description of the fluoropolymer composition or the physical properties (e.g. thermal conductivity, Hot Water Uptake, etc.) of the fluoropolymer composition are equally applicable to the thermal insulation layer 14. Similarly, any description of the thermal insulation layer 14 or physical properties of the thermal insulation layer 14 are equally applicable to the fluoropolymer composition. For example, both the fluoropolymer composition and the thermal insulation layer have a thermal conductivity less than about 0.20 W/mK at 205° C.

The fluoropolymer composition may also be generally referred to as a thermoplastic fluoropolymer composition. In other words, the fluoropolymer composition is not cross-linked, despite the fact that the fluoroelastomer may be capable of being crosslinked. Even though the fluoropolymer composition is not a crosslinked fluoropolymer composition, the fluoropolymer composition still has excellent mechanical properties. In particular, the fluoropolymer composition has an excellent balance of mechanical properties such as tensile strength, elongation, and ductility, and is capable of withstanding high pressures and temperatures. As such, the fluoropolymer composition is useful as the thermal insulation layer 14 of the insulated conduit 10 when the insulated conduit 10 is used to transport high temperature fluids (e.g. 200° C.) at depths exceeding 1,000 meters.

In addition to excellent mechanical properties, the fluoropolymer composition has excellent thermal insulation as demonstrated by the low thermal conductivity values. Likewise, as described above, because the thermal insulation layer 14 is the fluoropolymer composition, the thermal insulation layer 14 also has excellent thermal insulation as demonstrated by the low thermal conductivity values below. In particular the fluoropolymer composition has a thermal conductivity of less than about 0.20 W/mK at 205° C. Persons having ordinary skill in the art know how to measure thermal conductivity. For example, one example of a method of measuring thermal conductivity is to utilize a TPS 500 manufactured by Thermtest Inc. In particular, the thermal conductivity can be measured by compressing a specimen and contacting the specimen with a measuring probe of the TPS 500 at a given temperature. The geometry of the specimen once compressed is not particularly important, provided that the thickness of the specimen is greater than the probe diameter and the width of the specimen is greater than twice the probe diameter. For example, if the probe diameter is 6 mm, the specimen should have a thickness greater than 6 mm and a width greater than 12 mm. Of course, if the specimen contains multiple layers, a gap (i.e., air) should not be present between the layers. Once the specimen is formed, the specimen and the measuring probe are placed in the oven and heated to the measurement temperature (e.g. 205° C.). Once the temperature is reached, the thermal conductivity is measured.

In certain embodiments, the fluoropolymer composition has a thermal conductivity from greater than 0 to about 0.20 W/mK at 205° C., alternatively from about 0.10 W/mK to about 0.20 W/mK at 205° C., or alternatively from about 0.15 W/mK to about 0.20 W/mK at 205° C. The fluoropolymer composition also has a thermal conductivity less than about 0.20 W/mK at room temperature (e.g. ~23-25° C.) and 177° C. Alternatively, the fluoropolymer composition has a thermal conductivity from about 0.15 W/mK to about 0.20 W/mK at room temperature (e.g. ~23° C.) and 177° C.

Not only does the fluoropolymer composition have excellent thermal insulation, even at temperatures at or above 200° C., the fluoropolymer composition is also thermally stable at these temperatures. In other words, the fluoropolymer composition is capable of being exposed to temperatures at or above 200° C. without degrading the polymer and while providing excellent thermal insulation. As such, the fluoropolymer composition may be used as the thermal insulation layer 14. In order to determine if a specimen is thermally stable, the specimen is placed in a vessel filled with water. The water is then heated to 200° C. and the vessel is pressurized at 1,700 psi. Once the water reaches 200° C. and the vessel is pressurized, the specimen is maintained in the vessel at 200° C. and 1,700 psi for 16 hours. After this time, the vessel is cooled and depressurized. If the specimen is not deformed after the 16 hour period, the specimen is deemed to be thermally stable.

The fluoropolymer composition may also include one or more fillers. Typically, when fillers are included in the fluoropolymer composition, the fillers are insulating fillers. An insulating filler is a filler having a thermal conductivity less than about 0.25 W/mK at 205° C. When included in the fluoropolymer composition, the insulating filler is generally present in an amount of from about 1 to about 15 parts by weight, based on 100 parts by weight of the fluoropolymer composition. Alternatively, the insulating filler is present in an amount of from about 5 to about 10 parts by weight based on 100 parts by weight of the fluoropolymer composition.

Examples of insulating fillers include, but are not limited to, silica, syntactic additives, cork, wood, barium sulfate, a thermoset particle (such as crosslinked TFE/P particles), or a thermoplastic particle (such as a particle comprising polyphenyl sulfone, polyether ether ketone, polyaryl ether ketone, polyether ketone ketone), and combinations thereof. The inclusion of the insulating filler in the fluoropolymer composition is beneficial due to the fact that the insulating filler increases the thermal insulating properties of the fluoropolymer composition. However, it is also to be appreciated that the thermal insulating properties of the fluoropolymer composition may also be influenced and controlled by selection of particular fluoroelastomers and fluoroplastic polymers which make up the fluoropolymer composition.

When the insulating filler includes the syntactic additive, the syntactic additive may be any additive having a hollow interior provided the syntactic additive has a thermal conductivity less than about 0.25 W/mK at 205° C. The syntactic additive contributes to the excellent thermal conductivity of the fluoropolymer composition. Examples of suitable syntactic additives include, but are not limited to, hollow polymers, glass microspheres (e.g. glass bubble beads) or ceramic microspheres. In one embodiment, the syntactic additive is a hollow, lime-borosilicate glass microsphere. In addition, the inclusion of the syntactic additive generally increases the compressive creep and crush resistance of the fluoropolymer composition. Although various syntactic additives may be used, in certain embodiments, the syntactic additive has a crush strength of at least 15,000 psi, alternatively at least 20,000 psi, alternatively at least 25,000 psi, or alternatively at least 28,000 psi. Moreover, because the syntactic additive contributes to the excellent thermal conductivity of the fluoropolymer composition and also has a high crush strength, the fluoropolymer composition is particularly suitable as the thermal insulation layer 14 when the insulated conduit 10 is exposed to high temperatures and pressures in offshore, deep water environments.

In certain embodiments, the fluoropolymer composition comprises or consists essentially of (i) ETFE present in an amount of from about 50 to about 80 parts by weight based on 100 parts by weight of the fluoropolymer composition (ii) the fluoroelastomer present in an amount of from about 20 to about 50 parts by weight based on 100 parts by weight of the fluoropolymer composition, and (iii) the insulating filler present in an amount of from about 5 to about 15 parts by weight based on 100 parts by weight of the fluoropolymer composition. In this embodiment, the fluoroelastomer is selected from the group consisting of (a) TFE/P, (b) the FKM fluoropolymer, and (c) combinations thereof. In addition, the insulating filler is selected from the group consisting of silica, glass microspheres, and combinations thereof.

In certain embodiments, The fluoropolymer composition comprises or consists essentially of (i) the fluoroplastic polymer in an amount of from about 50 to about 80 parts by weight based on 100 parts by weight of fluoropolymer composition (ii) the fluoroelastomer present in an amount of from about 20 to about 50 parts by weight based on 100 parts by weight of the fluoropolymer composition, and (iii) the insulating filler present in an amount of from about 5 to about 15 parts by weight based on 100 parts by weight of the fluoropolymer composition. In certain embodiments, the fluoroelastomer is TFE/P, and the insulating filler is selected from the group consisting of silica, glass microspheres, and combinations thereof. In addition, the fluoroplastic polymer may comprise or consist essentially of EFFE. Alternatively, the fluoroplastic polymer may comprise or consist essentially of ETFE and the functionalized ETFE.

In other embodiments, the fluoropolymer composition may also include an auxiliary filler having a thermal conductivity greater than or equal to about 0.25 W/mK at 205° C. The auxiliary filler is different than the insulating filler. Examples of the auxiliary filler include, but are not limited to, carbon black, metal oxides such as magnesium oxide or zinc oxide, metal particles, metal hydroxides such as calcium hydroxide, etc, and combinations thereof.

The fluoropolymer composition may also include other additives. These additives are generally selected to tailor the fluoropolymer composition for a specific use. Examples of suitable additives include, but are not limited to, adhesion improvers, pigments, processing aids (e.g. calcium stearate), antioxidants, flame-retardants, stabilizers, and internal mold release agents. In general, the additives are collectively present in an amount of from about 0.1 to about 5 parts by weight based on 100 parts by weight of the fluoropolymer composition.

In certain embodiments, the fluoropolymer composition has less than a 15 weight percent increase in Hot Water Uptake. In other words, the fluoropolymer composition has greater than a 0 percent Hot Water Uptake but less than 15 percent. The Hot Water Uptake test is a test utilized to determine how much water is absorbed by the specimen when exposed to hot water in a highly pressurized environment. In the context of a thermal insulation layer, the more water that is absorbed by the specimen, the greater the actual thermal conductivity of the specimen when the specimen is used as a thermal insulation layer in offshore, deep water environments. In general, water is a significantly more efficient conductor of heat compared to an insulative layer, particularly an insulative layer including a fluoropolymer. As such, if water is absorbed by a thermal insulation layer, the insulative properties of the thermal insulation layer are adversely impacted by the presence of the water.

To measure the Hot Water Uptake of a specimen, the specimen is first formed into a disk having a 2 mm thickness and a 25 mm diameter. To form the disk, the specimen is compression molded into a 2 mm thick slab, which is then die-cut to form the disk having a 2 mm thickness and a 25 mm diameter. The weight of the specimen is then measured and recorded. The specimen is then placed in a vessel filled with water. The water is then heated to 200° C. and the vessel is pressurized at 1,700 psi. Once the water reaches 200° C. and the vessel is pressurized, the specimen is maintained in the vessel at 200° C. and 1,700 psi for 16 hours. After this time, the vessel is cooled and depressurized. The specimen is then weighed without allowing the specimen to dry. The weight percent increase of the specimen is then calculated. In general, a weight percent increase less than 15 percent is desirable.

As described above, the fluoropolymer composition has less than a 15 percent increase in Hot Water Uptake. In certain embodiments, the fluoropolymer composition has less than a 10 percent increase in Hot Water Uptake. As such, the fluoropolymer composition is useful as a thermal insulation layer 14 in offshore, deep water environments. In other words, because the fluoropolymer composition has a Hot Water Uptake less than 15 percent, the excellent thermal insulative properties of the fluoropolymer composition is not significantly impacted by the fact that the fluoropolymer composition is submerged in hot water and under high pressure when used as the thermal insulation layer 14 in offshore, deep water environments.

In one embodiment, the fluoropolymer composition consists essentially of (i) ETFE present in an amount of from about 50 to about 80 parts by weight based on 100 parts by weight of said fluoropolymer composition, (ii) the fluoroelastomer present in an amount of from about 20 to about 40 parts by weight based on 100 parts by weight of the fluoropolymer composition, and (iii) an additional component. In this embodiment, the fluoroelastomer is selected from the group consisting of (a) TFE/P, (b) the FKM fluoropolymer, and (c) combinations thereof. In this embodiment, the additional component is selected from the group consisting of (a) the functional fluoropolymer comprising the reaction product of ethylene, tetrafluoroethylene, and a monomer containing an anhydride group with the functional fluoropolymer present in an amount of from about 5 to about 15 parts by weight based on 100 parts by weight of the fluoropolymer composition, (b) the insulating filler having a thermal conductivity less than about 0.25 W/mK at 205° C. with the insulating filler present in an amount of from about 1 to about 15 parts by weight based on 100 parts by weight of the fluoropolymer composition, and (c) combinations thereof. In addition, the fluoropolymer composition of this embodiment has a thermal conductivity less than about 0.20 W/mK at 205° C. and has less than a 15 weight percent increase in Hot Water Uptake. In certain embodiments, the additional component includes both the insulating filler and the functional fluoropolymer; and the fluoroelastomer is TFE/P.

Figure 2:
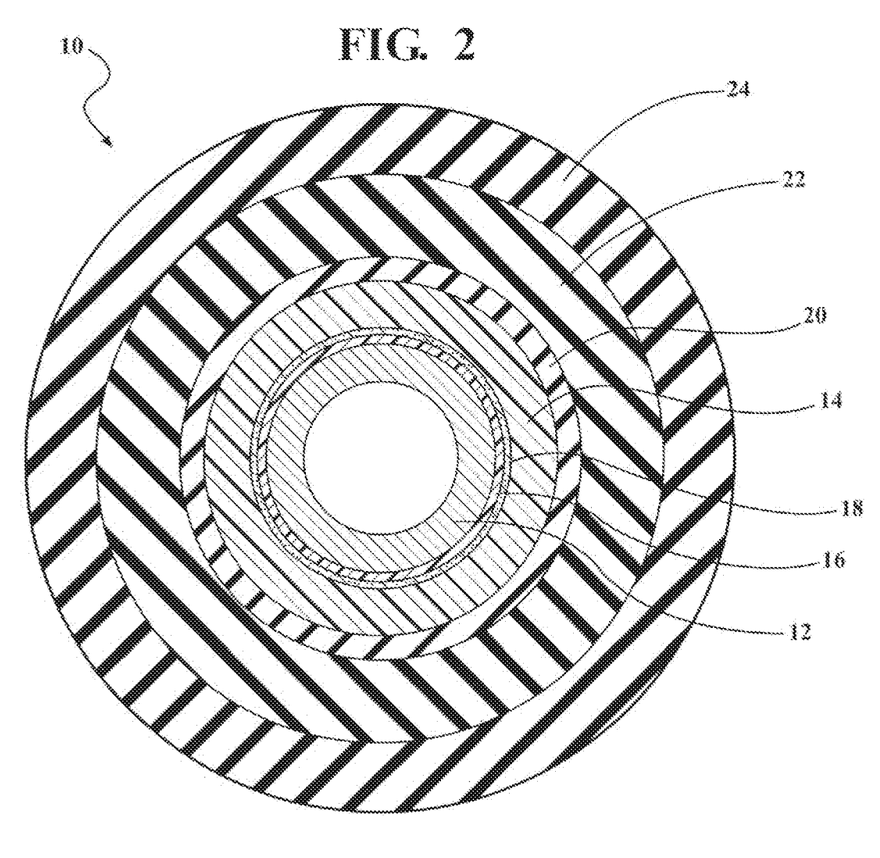
FIG. 2 is a cross-sectional view of another embodiment of the insulated conduit.

In certain embodiments as best shown in FIG. 2, the insulated conduit 10 may include one or more layers in addition to the thermal insulation layer 14. In certain embodiments, the insulted conduit 10 includes a corrosion protection layer 16. Typically, the corrosion protection layer 16 includes a high temperature corrosion protection material. Typically, the corrosion protection layer 16 is disposed directly on the pipe 12. Although not required, in certain embodiments, the thermal insulation layer 14 is disposed directly on the corrosion protection layer 16 (not shown in FIG. 2).

The corrosion protection layer 16 may include epoxy phenolics, polyphenylene sulphides, fluoropolymers, or polyimides, including modified versions and blends thereof. The thermal insulation layer 14 typically has excellent adhesion to the corrosion protection layer 16.

In certain embodiments, the corrosion protection layer 16 includes a fluoropolymer containing a functional group. Without being bound by any particular theory, it is believed that the functional group included in the fluoropolymer increases the adhesion of the corrosion protection layer 16, such as the adhesion to the pipe 12 and/or adhesion to the thermal insulation layer 14. Increasing the adhesion of the corrosion protection layer reduces the penetration of water to the pipe 12, which reduces the heat lost to the surrounding environment. Although not required, the fluoropolymer including the functional group may be formed by copolymerizing an anhydride with the other monomers that form the fluoropolymer. In one embodiment, the fluoropolymer including the functional group is the functionalized ETFE, which is formed from the reaction product of (i) a monomer containing an anhydride, (ii) ethylene, and (iii) tetrafluoroethylene. In certain embodiments, the monomer containing the anhydride is itaconic anhydride. In other embodiments, the fluoropolymer including the functional group contains a carbonyl functional group derived from a peroxide based polymerization initiator. In still other embodiments, the fluoropolymer including the functional group is functionalized by grafting maleic anhydride onto the backbone of the fluoropolymer or a side chain extending from the backbone of the fluoropolymer. Of course, it is to be appreciated that the fluoropolymer containing the functional group may include one or more functional groups. The amount of functional groups present on the fluoropolymer containing the functional group can be varied to meet the particular adhesion requirements of the corrosion protection layer 16.

In one embodiment, the insulated conduit 10 includes the corrosion protection layer 16 disposed directly on the pipe 12. In this embodiment, the corrosion protection layer 16 includes the reaction product of (i) itaconic anhydride, (ii) ethylene, and (iii) tetrafluoroethylene. In addition, the insulated conduit 10 includes the thermal insulation layer 14 disposed directly on the corrosion protection layer 16. The thermal insulation layer 14 comprises or consists essentially of the fluoroplastic polymer in an amount of from about 50 to about 80 parts by weight and the fluoroelastomer in an amount of from about 20 to about 50 parts by weight, each based on 100 parts by weight of the thermal insulation layer 14. In addition, the fluoroplastic polymer includes the functionalized ETFE in an amount of from about 5 to about 20 parts by weight, based on 100 parts by weight of the thermal insulation layer 14. Typically, in this embodiment, the remaining portion of the fluoroplastic polymer is ETFE. The fluoroelastomer is typically TFE/P.

In another embodiment, the insulated conduit 10 includes the corrosion protection layer 16 disposed directly on the pipe 12. In this embodiment, the corrosion protection layer 16 includes the reaction product of (i) itaconic anhydride, (ii) ethylene, and (iii) tetrafluoroethylene. In addition, the insulated conduit 10 includes the thermal insulation layer 14 disposed directly on the corrosion protection layer 16. The thermal insulation layer 14 comprises or consists essentially of (i) the fluoroplastic polymer in an amount of from about 50 to about 80 parts by weight based on 100 parts by weight of thermal insulation layer 14 (ii) the fluoroelastomer present in an amount of from about 20 to about 50 parts by weight based on 100 parts by weight of the thermal insulation layer 14, and (iii) the insulating filler present in an amount of from about 5 to about 15 parts by weight based on 100 parts by weight of the thermal insulation layer 14. In this embodiment, the fluoroelastomer is typically TFE/P, and the insulating filler is selected from the group consisting of silica, glass microspheres, and combinations thereof. In addition, the fluoroplastic polymer may comprise or consist essentially of EFFE. Alternatively, the fluoroplastic polymer may comprise or consist essentially of ETFE and the functionalized ETFE.

The insulated conduit 10 may also include an intermediate adhesive layer 18, which may be applied directly to the insulated conduit 10 (not shown in FIG. 2) or may be applied over the corrosion protection layer 16. Typically, when the intermediate adhesive layer 18 is present, the thermal insulation layer 14 is applied over the intermediate adhesive layer 18.

In certain embodiments, the intermediate adhesive layer 18 includes polymers or reactive systems containing functional groups having an affinity to the layers in contact with the intermediate adhesive layer 18 (e.g. the thermal insulation layer 14 and/or the corrosion protection layer 16). The insulated conduit 10 may have one or more intermediate adhesive layers 18.

When the intermediate adhesive layer 18 is in contact with the thermal insulation layer 14, the intermediate adhesive layer 18 may bond to the thermal insulation layer 14 during the extrusion process. In certain embodiments, the intermediate adhesive layer 18 bonds to the thermal insulation layer 14 when the fluoropolymer composition includes the functional fluoropolymer. Suitable adhesives for use as the intermediate adhesive layer 18 are manufactured by companies such as The Dow Chemical Company, Lord Corporation, and 3M Corporation.

The intermediate adhesive layer 18 may be applied by powder spray application, liquid spray application, or sidewrap, crosshead extrusion or co-extrusion methods, including co-extrusion with the melt processable fluoropolymer composition.

Regardless of the layer(s) in contact with the thermal insulation layer 14, the thermal insulation layer 14 firmly adheres to that layer. Adhesion between the layers, also known as interlayer adhesion, is also dependent upon the coating temperature and the mode of application of the layers. For example, it may be necessary to pre-heat the corrosion protection layer 16 or system prior to the application of the thermal insulation layer 14 to better adhere the two layers together and maximize interlayer adhesion. As such, when the corrosion protection layer 16 is disposed about the outer surface of the pipe 12, it is particularly advantageous to include the intermediate adhesive layer 18, as the thermal insulation layer 14 has excellent adhesion to the intermediate adhesive layer 18. Interlayer adhesion may also be accomplished through the activation of one or more of the surfaces to be adhered using plasma or corona discharge treatment. This may also be utilized in conjunction with an intermediate adhesive layer 18.

As shown in FIG. 2, a first protective layer 20 may be applied over the thermal insulation layer 14 to provide further resistance to pressure in the offshore, deep water environments. The first protective layer 20 may include the fluoropolymer composition. It is to be appreciated that the first protective layer 20 is not necessary in all embodiments, due to the excellent mechanical and thermal properties of the thermal insulation layer 14.

In certain embodiments, the insulated conduit 10 may include a second protective layer 22. In these embodiments, the insulated conduit 10 may also include a third protective layer 24. It is to be appreciated that the second and third protective layers 22, 24 may independently include the fluoropolymer composition.

Typically the second and third protective layers 22, 24 may independently include a thermoplastic polymer, such as conventional polyethylene, polypropylene, polybutylene, polyurethane and copolymers, blends and elastomers thereof. Alternatively, the second and third protective layers 22, 24 may be independently selected from any of the foamed or solid polystyrene or styrene-based thermoplastics.

In an alternative embodiment, the second and third protective layers 22, 24 may independently include elastomers such as hydrogenated nitrile butadiene rubber (HNBR), nitrile butadiene rubber (NBR), silicone rubber, ethylene propylene diene monomer EPDM rubber, and butyl rubber.

In an alternative embodiment, the first, second and/or third protective layers 20, 22, and/or 24 may independently include an epoxy-modified polymer network, an epoxy-urethane hybrid system, an epoxy-olefin hybrid system, a fusion bonded epoxy (FBE), and a polydicyclopentadiene (PDCPD). In these embodiments, the method further comprises applying (e.g. extruding, coating, thermosetting in a shell mold) the first, second and/or third protective layers 20, 22, and/or 24 about the pipe 12. In these embodiments, the first, second and/or third protective layers 20, 22, and/or 24 may be foamed or solid. When the layer is foamed, it may either be a blown foam or syntactic foam having a degree of foaming of up to about 50 percent, for example from about 5 percent to about 30 percent. Typical curing agents for the epoxy-modified polymer network, the epoxy-urethane hybrid system, and the epoxy-olefin hybrid system materials include, but are not limited to, homopolymerization by catalyst, amines, anhydrides, phenols, thiols, and isocyanates.

Alternatively, the second and third protective layers 22, 24 may include any high temperature resistant thermoplastics, either solid or foamed, disclosed in above-mentioned U.S. Pat. No. 8,397,765 by Jackson et al, which is incorporated by reference in its entirety. The high temperature resistant thermoplastics disclosed therein are able to withstand operating temperatures of about 130° C. or higher. The high temperature resistant thermoplastic is selected from one or more members of the group comprising: polycarbonate, polyphenylene oxide, polyphenylene oxide blended with polypropylene, polystyrene or polyamide, polycarbonate blended with polybutylene terephthalate, polyethylene terephthalate, acrylonitrile butadiene styrene, acrylonitrile styrene acrylate, or polyetherimide, polyamides, including polyamide 12 and 612 and elastomers thereof, polymethylpentene and blends thereof, cyclic olefin copolymers and blends thereof, and, partially crosslinked thermoplastic elastomers, also known as thermoplastic vulcanizates or dynamically vulcanized elastomers.

The second and/or third protective layers 22, 24 may independently be foamed or solid. The second and/or third protective layers 22, 24 may either be a blown foam or a syntactic foam having a degree of foaming of up to about 50 percent, for example from about 5 to about 30 percent.

It is to be appreciated that the first, second, and third protective layer 20, 22, 24 may increase the mechanical or chemical performance, such as impact, abrasion, crush or moisture resistance, of the insulated conduit 10. In certain embodiments, it may be advantageous to prepare the outermost layer (e.g. the third protective layer 24 in FIG. 2) from a polymeric material having superior impact, abrasion, crush or chemical resistance to that of the fluoropolymer composition. Such a material may include the fluoropolymer composition blended with suitable polymeric modifiers, compatibilizers, or reinforcing fillers or fibers, or it may include a dissimilar, preferably compatible, polymeric material. In the latter case, it may be necessary to apply an additional intermediate adhesive layer 14 to promote adhesion. It may also be advantageous to progressively foam to higher degrees the layers exterior to thermal insulation layer 14.

The present disclosure also provides a method for forming the thermal insulation layer 14 about a conduit. The method includes providing a conduit and a melt processable fluoropolymer composition. The conduit includes a pipe 12 having an outer surface. The melt processable fluoropolymer composition may be any of the fluoropolymer compositions described above. The method also includes extruding the melt processable fluoropolymer composition about the outer surface of the pipe 12 of the conduit to form the thermal insulation layer 14 about the insulated conduit 10. After the melt processable fluoropolymer composition cools, the melt processable fluoropolymer composition is referred to as the fluoropolymer composition and/or the thermal insulation layer 14. Likewise, after the melt processable fluoropolymer composition has been extruded and cooled, the conduit is referred to as the insulated conduit 10.

Extrusion may be accomplished using single screw extrusion, either in single or tandem configuration, or by twin-screw extrusion methods. In the case of single screw extrusion, the extruder screw may be either single stage or 2-stage design.

Although not required, the melt processable fluoropolymer composition may be applied by a side-wrap technique whereby the melt processable fluoropolymer composition is extruded through a flat strip or sheet die. During extrusion, the melt processable fluoropolymer composition is extruded in the form of a sheet or tape which is then wrapped around the pipe 12. The application of the melt processable fluoropolymer composition by the side-wrap technique typically includes wrapping the pipe 12 as the pipe 12 is simultaneously rotated and conveyed forwardly along its longitudinal axis. As such, the melt processable fluoropolymer composition is wound in a spiral pattern about the outer surface of the pipe 12. Despite the fact that the melt processable fluoropolymer composition is wound in a spiral pattern about the outer surface of the pipe 12, the melt processable fluoropolymer composition fuses into a continuous layer because the temperature of the melt processable fluoropolymer composition is above the melting point of the fluoroplastic polymer. During extrusion, the melt processable fluoropolymer composition is heated above the melting point of the fluoroplastic polymer, which subsequently allows the melt processable fluoropolymer composition to fuse into a continuous layer.

The amount of fluoroplastic polymer and fluoroelastomer in the melt processable fluoropolymer composition is designed to allow the melt processable fluoropolymer composition to fuse into a continuous layer while balancing the need for the layer to "set-up" or develop structural integrity without requiring the layer to be crosslinked. As such, in certain embodiments, after extruding the melt processable fluoropolymer composition about the outer surface of the pipe 12, the melt processable fluoropolymer composition is cooled without further heating of the melt processable fluoropolymer composition. As such, the amount of the fluoroplastic polymer and fluoroelastomer present in the melt processable fluoropolymer composition achieves not only the desired thermal conductivity, mechanical properties, and Hot Water Uptake, but also achieves a cooperative balance during application. For example, if a composition only containing fluoroelastomer (i.e., a composition not including the fluoroplastic polymer) was extruded about the outer surface of the pipe 12, the resulting layer would not develop structural integrity and subsequently deform. Conversely, if a composition including only the fluoroplastic polymer (i.e., a composition not including the fluoroelastomer) was extruded about the outer surface of the pipe 12, the resulting layer would not adequately fuse together, which would increase the Hot Water Uptake in the sample and thus adversely impact the thermal conductivity as described above.

The method may further include applying the additional layers described above (e.g. the corrosion protection layer 16, the intermediate adhesive layer 18, and the first, second, and third protective layers 20, 22, and 24) to the insulated conduit 10. When included, the additional layers may be extruded and applied via the side-wrap technique described above.

Examples

Ten fluoropolymer compositions were prepared as shown below in Table I. In addition, eleven comparative fluoropolymer compositions were prepared as shown below in Table II. Each value provided in Tables I and II is the parts by weight of the respective component within each composition based on 100 parts by weight of the particular composition.

TABLE I

| Component | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Fluoropolymer 1 | 60 | 57.6 | 50 | 70 | 50 | 70 | 50 | 49.2 | 47.3 | 45.5 |
| Fluoropolymer 2 | 40 | 38.4 | 40 | 29 | 49 | — | — | 39.3 | 37.8 | 36.4 |
| Fluoropolymer 3 | — | — | — | — | — | 29 | 49 | — | — | — |
| Fluoropolymer 4 | — | — | 10 | — | — | — | — | 9.8 | 9.5 | 9.1 |
| Additive 1 | — | 4.0 | — | — | — | — | — | — | — | — |
| Additive 3 | — | — | — | 1 | 1 | 1 | 1 | — | — | — |
| Additive 4 | — | — | — | — | — | — | — | 1.7 | 5.4 | 8.9 |

TABLE II

| | Comparative Example. No. | | | | | | | | | | |
|---|---|---|---|---|---|---|---|---|---|---|---|
| Component | 1 | 2 | 3 | 4 | 5 | 6 | 7 | 8 | 9 | 10 | 11 |
| Fluoropolymer 1 | 30 | 30 | 100 | 96.2 | 97.4 | 96.2 | 91.3 | — | — | — | — |
| Fluoropolymer 2 | 69 | — | — | — | — | — | — | — | — | — | — |
| Fluoropolymer 3 | — | 69 | — | — | — | — | — | — | — | — | 100 |
| Fluoropolymer 4 | — | — | — | — | — | — | — | 100 | — | — | — |
| Fluoropolymer 5 | — | — | — | — | — | — | — | — | 100 | — | — |
| Fluoropolymer 6 | — | — | — | — | — | — | — | — | — | 100 | — |
| Additive 1 | — | — | — | 3.8 | 2.6 | — | — | — | — | — | — |
| Additive 2 | — | — | — | — | — | 3.8 | 8.7 | — | — | — | — |
| Additive 3 | 1 | 1 | — | — | — | — | — | — | — | — | — |

Fluoropolymer 1 is an ETFE copolymer.

Fluoropolymer 2 is a TFE/P copolymer.

Fluoropolymer 3 is an ASTM Type 2 FKM fluoropolymer

Fluoropolymer 4 is a functionalized ETFE, formed from the reaction product of itaconic anhydride, ethylene and tetrafluoroethylene.

Fluoropolymer 5 is a PFA copolymer.

Fluoropolymer 6 is a PVDF.

Additive 1 is a high strength glass bubble bead having a 0.6 g/cc true density.

Additive 2 is a hydrophobic fumed silica which has 2.2 g/cc true density

Additive 3 is a compatibilizing copolymer containing ethylene.

Additive 4 is a high strength glass bubble bead having a 0.38 g/cc true density.

Examples 1-10 and Comparative Examples 1-11 were evaluated for temperature resistance, Hot Water Uptake, and thermal conductivity using the test methodology described above. Examples 8-10 were also evaluated for Vicat Softening temperature. The Vicat Softening Temperature was measured in accordance with JIS K7206 utilizing the A-120 method, which is using 10N force and 120 degrees C./hour speed. The particular example was formed into a 20 mm outer diameter disk having a thickness of 3 mm. The reported Vicat Softening Temperature value is the temperature that a jig penetrated 1 mm into the particular example. The resulting data is displayed in Table III.

TABLE III

|  | 205° C. Temperature Resistance | Hot Water Uptake | Thermal Conductivity (W/mK) | | | Vicat Softening Temp. (° C.) |
| --- | --- | --- | --- | --- | --- | --- |
|  |  |  | ~23° C. | 177° C. | 205° C. |  |
| Ex. 1 | Pass | 4.0 | 0.200 | 0.192 | 0.190 | — |
| Ex. 2 | Pass | 12.5 | 0.196 | 0.189 | — | — |
| Ex. 3 | Pass | 3.3 | 0.202 | 0.188 | 0.186 | — |
| Ex. 4 | Pass | 4.5 | 0.201 | — | — | — |
| Ex. 5 | Pass | 8.8 | 0.193 | — | — | — |
| Ex. 6 | Pass | 1.0 | 0.195 | — | — | — |
| Ex. 7 | Pass | 2.5 | 0.176 | — | — | — |
| Ex. 8 | Pass | 3.3 | 0.194 | — | 0.171 | 103.9 |
| Ex. 9 | Pass | 4.0 | 0.192 | — | — | 128.2 |
| Ex. 10 | Pass | 5.1 | 0.178 | — | — | 141.3 |
| Comp. Ex. 1 | Fail | 18.8 | 0.184 | — | — | — |
| Comp. Ex. 2 | Fail | — | 0.164 | — | — | — |
| Comp. Ex. 3 | Pass | 0.2 | 0.213 | 0.202 | — | — |
| Comp. Ex. 4 | Pass | 5.6 | 0.210 | 0.206 | — | — |
| Comp. Ex. 5 | Pass | 4.0 | 0.206 | 0.205 | — | — |
| Comp. Ex. 6 | Pass | 0.8 | 0.204 | 0.218 | — | — |
| Comp. Ex. 7 | Pass | 1.6 | 0.220 | 0.227 | — | — |
| Comp. Ex. 8 | Pass | 0.5 | 0.207 | — | — | — |
| Comp. Ex. 9 | Pass | 0 | 0.238 | — | — | — |
| Comp. Ex. 10 | Pass | 0 | 0.244 | — | — | — |
| Comp. Ex. 11 | Fail | — | — | — | — | — |

As shown in Table III, Examples 1-10 each passed the 205° C. Temperature Resistance test. As such, Examples 1-10 are thermally stable. Conversely, Comparative Examples 1, 2, and 11 did not pass the 205° C. Temperature Resistance test, which indicates that these comparative samples are not thermally stable. Notably, Comparative Examples 1, 2, and 11 each contain a fluoroplastic polymer and a fluoroelastomer. However, Comparative Examples 1, 2, and 11 each contain greater than 50 parts by weight of the fluoroelastomer and less than 50 parts by weight of the fluoroplastic polymer. In contrast, Examples 1-10, which are thermally stable at 205° C., also contain the fluoroplastic polymer and a fluoroelastomer, but the fluoroplastic polymer is present in an amount greater than 50 parts by weight, and the fluoroelastomer is present in an amount between 20 to 50 parts by weight, each based on 100 parts by weight of the respective composition.

As also shown in Table III, Examples 1-10 have a thermal conductivity below 0.205 at ~23° C. Moreover, Examples 1-3 have a thermal conductivity less than 0.195 at 177° C., and Examples 1, 3, and 8 have a thermal conductivity less than 0.191 at 205° C. In stark contrast, Comparative Examples 2-7 have a thermal conductivity greater than 0.20 at 177° C. In addition, Examples 8-10 have a Vicat Softening Temperature between 100 and 145° C. As such, the thermal conductivity data, thermal stability data, and Vicat Softening Temperature collectively indicates that Examples 1-10 are better suited for a use as a thermal insulation layer when compared to Comparative Examples 1-11.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present disclosure has been described in an illustrative manner, and it is to be understood that the terminology which has been used is intended to be in the nature of words of description rather than of limitation. Many modifications and variations of the present disclosure are possible in light of the above teachings. The present disclosure may be practiced otherwise than as specifically described. The subject matter of all combinations of independent and dependent claims, both singly and multiply dependent, is herein expressly contemplated.

The invention claimed is:

1. An insulated conduit for use in offshore, deep water environments, said insulated conduit comprising:
   a pipe having an outer surface; and
   a fluoropolymer composition disposed about said outer surface of said pipe for providing a thermoplastic thermal insulation layer, said fluoropolymer composition comprising,
   a fluoroplastic polymer present in an amount of at least 50 parts by weight based on 100 parts by weight of said fluoropolymer composition, and
   a fluoroelastomer present in an amount of from about 20 to about 50 parts by weight based on 100 parts by weight of said fluoropolymer composition;
   wherein said fluoropolymer composition has a thermal conductivity less than about 0.20 W/mK at 205° C.

2. The insulated conduit as set forth in claim 1 wherein said fluoropolymer composition has a thermal conductivity of from about 0.15 to about 0.20 W/mK at 205° C.

3. The insulated conduit as set forth in claim 1 wherein said fluoroplastic polymer comprises an ethylene/tetrafluoroethylene (ETFE) copolymer.

4. The insulated conduit as set forth in claim 1 wherein said fluoroplastic polymer comprises;
   (i) an ethylene/tetrafluoroethylene (ETFE) copolymer, and
   (ii) a functional fluoropolymer comprising the reaction product of ethylene, tetrafluoroethylene, and a monomer containing an anhydride group.

5. The insulated conduit as set forth in claim 1 wherein said fluoroelastomer is selected from the group consisting of (i) a tetrafluoroethylene/propylene (TFE/P) copolymer, (ii) an FKM fluoropolymer, and (iii) combinations thereof.

6. The insulated conduit as set forth in claim 1 wherein said fluoropolymer composition consists essentially of said fluoroplastic polymer and said fluoroelastomer and wherein said fluoroelastomer is tetrafluoroethylene/propylene (TFE/P).

7. The insulated conduit as set forth in claim 1 wherein said fluoropolymer composition further comprises an insulating filler having a thermal conductivity less than about 0.25 W/mK at 205° C., and wherein said insulating filler is present in an amount of from about 1 to about 15 parts by weight based on 100 parts by weight of said fluoropolymer composition.

8. The insulated conduit as set forth in claim 6 wherein said fluoropolymer composition has less than a 15 weight percent increase in Hot Water Uptake.

9. The insulated conduit as set forth in claim 1 further comprising a protective layer disposed about said outer surface of said pipe, wherein said protective layer comprises an epoxy-modified polymer network, an epoxy-urethane hybrid system, an epoxy-olefin hybrid system, a fusion bonded epoxy, a polydicyclopentadiene, or a combination thereof.

10. The insulated conduit as set forth in claim 1 further comprising a corrosion protection layer disposed directly on said pipe, wherein said thermoplastic thermal insulation layer is disposed directly on said corrosion protection layer, and wherein said corrosion protection layer comprises a fluoropolymer containing a functional group.

11. The insulated conduit as set forth in claim 10 wherein said fluoropolymer containing a functional group is formed from the reaction product of (i) itaconic anhydride, (ii) ethylene, and (iii) tetrafluoroethylene.

12. A method of forming a thermoplastic thermal insulation layer about a conduit for use in offshore, deep water environments, with the conduit comprising a pipe having an outer surface, said method comprising:
   providing a melt processable fluoropolymer composition, the melt processable fluoropolymer composition comprising,
   a fluoroplastic polymer present in an amount of at least 50 parts by weight based on 100 parts by weight of the fluoropolymer composition, and
   a fluoroelastomer present in an amount of from about 20 to about 50 parts by weight based on 100 parts by weight of the melt processable fluoropolymer composition; and
   extruding the melt processable fluoropolymer composition to form the thermoplastic thermal insulation layer about the outer surface of the pipe of the conduit;
   wherein the thermoplastic thermal insulation layer has a thermal conductivity of less than about 0.20 W/mK at 205° C.

13. The method as set forth in claim 12 further comprising cooling the melt processable fluoropolymer composition after extruding the melt processable fluoropolymer composition without further heating the melt processable fluoropolymer composition.

14. The method as set forth in claim 12 wherein the fluoroplastic polymer comprises an ethylene/tetrafluoroethylene (ETFE) copolymer.

15. The method as set forth in claim 12 wherein the fluoroplastic polymer comprises;
   (i) an ethylene/tetrafluoroethylene (ETFE) copolymer, and
   (ii) a functional fluoropolymer comprising the reaction product of ethylene, tetrafluoroethylene, and a monomer containing an anhydride group.

16. The method as set forth in claim 12 wherein the fluoroelastomer is selected from the group consisting of (i) a tetrafluoroethylene/propylene (TFE/P) copolymer, (ii) an FKM fluoropolymer, and (iii) combinations thereof.

17. The method as set forth in claim 12 wherein the fluoropolymer composition consists essentially of the fluoroplastic polymer and the fluoroelastomer and wherein the fluoroelastomer is tetrafluoroethylene/propylene (TFE/P).

18. The method as set forth in claim 12 wherein the fluoropolymer composition further comprises an insulating filler having a thermal conductivity less than about 0.25 W/mK at 205° C., wherein the insulating filler is present in an amount of from about 1 to about 15 parts by weight based on 100 parts by weight of the fluoropolymer composition.

19. The method as set forth in claim 17 wherein the thermoplastic thermal insulation layer has less than a 15 weight percent increase in Hot Water Uptake.

20. The method as set forth in claim 12 further comprising applying a protective layer about the outer surface of the pipe, wherein the protective layer comprises an epoxy-modified polymer network, an epoxy-urethane hybrid system, an epoxy-olefin hybrid system, a fusion bonded epoxy, a polydicyclopentadiene, or a combination thereof.

21. The method as set forth in claim 12 further comprising applying a corrosion protection layer directly to the pipe and applying the thermoplastic thermal insulation layer directly to the corrosion protection layer, wherein the corrosion protection layer comprises a fluoropolymer containing a functional group.

22. The method as set forth in claim 21 wherein the fluoropolymer containing the functional group is formed from the reaction product of (i) itaconic anhydride, (ii) ethylene, and (iii) tetrafluoroethylene.

23. An insulated conduit for use in offshore, deep water environments, said insulated conduit comprising:
    a pipe having an outer surface; and
    a fluoropolymer composition disposed about said outer surface of said pipe for providing a thermoplastic thermal insulation layer, said fluoropolymer composition consisting essentially of,
    an ethylene/tetrafluoroethylene (ETFE) copolymer present in an amount of from about 50 to about 80 parts by weight based on 100 parts by weight of said fluoropolymer composition;
    a fluoroelastomer selected from the group consisting of (i) a tetrafluoroethylene/propylene (TFE/P) copolymer, (ii) an FKM fluoropolymer, and (iii) combinations thereof, said fluoroelastomer present in an amount of from about 20 to about 40 parts by weight based on 100 parts by weight of said fluoropolymer composition; and
    an additional component selected from the group consisting of,
    (i) a functional fluoropolymer comprising the reaction product of ethylene, tetrafluoroethylene, and a monomer containing an anhydride group with said functional fluoropolymer present in an amount of from about 5 to about 15 parts by weight based on 100 parts by weight of said fluoropolymer composition,
    (ii) an insulating filler having a thermal conductivity less than about 0.25 W/mK at 205° C., wherein said insulating filler is present in an amount of from about 1 to about 15 parts by weight based on 100 parts by weight of said fluoropolymer composition, and
    (iii) combinations thereof;
    wherein said fluoropolymer composition has a thermal conductivity less than about 0.20 W/mK at 205° C.; and
    wherein said fluoropolymer composition has less than a 15 weight percent increase in Hot Water Uptake.

24. The insulated conduit as set forth in claim 23 wherein said fluoroelastomer is tetrafluoroethylene/propylene (TFE/P), and wherein said additional component includes both said functional fluoropolymer and said insulating filler.

25. The insulated conduit as set forth in claim 9 wherein said fluoropolymer composition is not crosslinked and wherein said fluoropolymer composition is disposed between said pipe and said protective layer.

* * * * *